United States Patent
Rydbeck et al.

(10) Patent No.: US 6,332,006 B1
(45) Date of Patent: Dec. 18, 2001

(54) APPARATUS AND METHODS FOR PROVIDING HIGH-PENETRATION MESSAGING IN WIRELESS COMMUNICATIONS SYSTEMS

(75) Inventors: Nils Rydbeck; Barbara Molnar, both of Cary; Jiann-Ching Guey, Durham; Ali Khayrallah; R. David Koilpillai, both of Apex, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/195,790

(22) Filed: Nov. 18, 1998

(51) Int. Cl.⁷ ............... H04B 1/02; H04B 1/22; H04B 7/216; H04B 1/69; H04J 13/02

(52) U.S. Cl. ............ 375/262; 375/259; 375/261; 375/265; 375/267; 375/279; 370/209; 455/132

(58) Field of Search .................. 375/259, 261, 375/262, 265, 267, 219, 247, 341, 241, 279, 281; 455/132; 370/209

(56) References Cited

U.S. PATENT DOCUMENTS

| | | | |
|---|---|---|---|
| 4,447,903 | 5/1984 | Sewerinson | 371/68 |
| 4,495,619 | 1/1985 | Acampora | 370/104 |
| 4,868,758 | 9/1989 | Kokubu | 705/400 |

(List continued on next page.)

FOREIGN PATENT DOCUMENTS

| | | |
|---|---|---|
| 0 817 397 A1 | 1/1998 | (EP) . |
| 0 838 964 A2 | 4/1998 | (EP) . |
| WO 98/31165 | 7/1998 | (WO) . |
| WO 98/33346 | 7/1998 | (WO) . |

OTHER PUBLICATIONS

W.T. Webb, "QAM: the modulation scheme for future mobile radio communications?," Electronics & Communication Engineering Journal, Aug. 1992, pp. 167–176.

(List continued on next page.)

Primary Examiner—Chi Pham
Assistant Examiner—Dung Xo Nguyen
(74) Attorney, Agent, or Firm—Myers Bigel Sibley & Sajovec

(57) ABSTRACT

A message, e.g., a control message, a short message, a voice message or a data message, is transmitted on at least one of a first communications channel having a first redundancy level or a second communications channel having a second, higher redundancy level. A radio communications signal is received on one of the first communications channel and the second communications channel. The received radio communications signal is demodulated to recover the message using a first demodulation scheme if the radio communications signal is received on the first communications channel and using a second demodulation scheme if the radio communications signal is received on the second communications channel. According to an aspect of the invention, the received radio communications signal is coherently demodulated if the radio communications signal is received over the first communications channel and non-coherently demodulated if the radio communications signal is received over the second communications channel. According to another aspect, the message is transmitted on the first communications channel using a first modulation constellation, and transmitted on the second communications channel using a second modulation constellation representing a subset of the first modulation constellation. In other embodiments of the present invention, a first radio communications signal is transmitted representing the message encoded according to one of a first code or a second code that represents a concatenation of the first code and an additional code, such as an orthogonal code or a quasi orthogonal code. Related systems and apparatus are also described.

69 Claims, 11 Drawing Sheets

U.S. PATENT DOCUMENTS

| | | | |
|---|---|---|---|
| 5,065,393 | 11/1991 | Sibbitt et al. | 370/360 |
| 5,204,874 | 4/1993 | Falconer et al. | 375/200 |
| 5,303,297 | 4/1994 | Hillis | 455/406 |
| 5,313,653 | 5/1994 | Sasuta | 455/17 |
| 5,341,401 | 8/1994 | Farjh et al. | 375/94 |
| 5,450,453 | 9/1995 | Frank | 375/200 |
| 5,465,398 | 11/1995 | Flammer | 455/69 |
| 5,608,446 | 3/1997 | Carr et al. | 348/6 |
| 5,612,948 | 3/1997 | Fette et al. | 379/252 |
| 5,621,737 | 4/1997 | Bucher | 371/5.1 |
| 5,625,877 | 4/1997 | Dunn et al. | 455/454 |
| 5,657,325 | 8/1997 | Lou et al. | 370/344 |
| 5,664,006 | 9/1997 | Monte et al. | 455/405 |
| 5,666,649 | 9/1997 | Dent | 455/445 |
| 5,751,799 | 5/1998 | Mori | 379/114 |
| 5,754,599 * | 5/1998 | Ling et al. | 375/340 |
| 5,828,737 | 10/1998 | Sawyer | 379/114 |
| 5,884,170 | 3/1999 | Valentine et al. | 455/433 |
| 5,898,736 * | 4/1999 | Saito et al. | 375/316 |
| 5,909,434 * | 6/1999 | Odenwalder et al. | 370/342 |
| 5,946,356 | 8/1999 | Felix | 375/295 |
| 5,946,670 | 8/1999 | Motohashi et al. | 705/400 |
| 5,966,384 | 10/1999 | Felix et al. | 370/465 |
| 5,987,076 * | 11/1999 | Zehavi et al. | 375/340 |
| 6,097,937 | 8/2000 | Sawyer | 455/406 |
| 6,148,208 | 11/2000 | Love | 455/442 |
| 6,154,643 | 11/2000 | Cox | 455/406 |
| 6,188,885 * | 2/2001 | Kolev et al. | 455/413 |

OTHER PUBLICATIONS

Giuliano Benelli, "Two New Coding Techniques for Diversity Communication Systems," IEEE Transactions on Communications, Sep. 1990, No. 9, New York, US, pp. 1530–1538.

International Search Report, PCT/US99/21128, Jan. 17, 2000.

International Search Report, PCT/US99/21463, Feb. 21, 2000.

Matthews, Adrian, "Applications of IS–136 to Personal Communication Services," IEEE Publication Date: Apr. 30, 1996, pp. 223–228.

International Search Report, PCT/US00/07105, Jul. 6, 2000.

International Search Report, PCT/US00/08279, Aug. 1, 2000.

* cited by examiner

APPARATUS AND METHODS FOR PROVIDING HIGH-PENETRATION MESSAGING IN WIRELESS COMMUNICATIONS SYSTEMS

RELATED APPLICATION

The present application is related to a United States Patent Application entitled "Wireless Communications Standard and Robust Services and Methods of Operation Thereof," assigned to the assignee of the present invention, filed concurrently herewith, and incorporated herein by reference in its entirety.

FIELD OF THE INVENTION

The present invention relates to communications systems and methods, and more particularly, to wireless communications systems and methods.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which can further increase channel capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the dual analog/digital IS-54B standard employed in the United States, in which each of the frequency bands of the traditional analog cellular spectrum are subdivided into 3 time slots, and systems conforming to the GSM standard, which divides each of a plurality of frequency bands into 8 time slots. In these TDMA systems, each user communicates with the base station using bursts of digital data transmitted during the user's assigned time slots.

A channel in a TDMA system typically includes at least one time slot on at least one frequency band. As discussed above, channels are used to communicate voice, data or other information between users, for example, between a radiotelephone and a landline telephone. Channels may be assigned to predetermined slots of predetermined frequency bands, as in the case of dedicated control channels. Included in the typical set of dedicated control channels transmitted in a cell are forward control channels which are used to broadcast control information in a cell of the radiotelephone system to radiotelephones which may seek to access the system. The control information broadcast on a forward control channel may include such things as the cell's identification, an associated network identification, system timing information and other information needed to access the radiotelephone system from a radiotelephone.

Channels in a TDMA system may also be dynamically assigned by the system when and where needed. In addition, some systems, such as those conforming to the GSM standard, "frequency hop" traffic channels, i.e., change the frequency band on which a particular traffic channel is transmitted on a frame-by-frame basis. Frequency hopping can reduce the probability of interference events between channels, by reducing the likelihood that the same two stations will use the same frequency at the same time. This can help provide for communications quality related to average instead of worst case interference.

Instead of or in addition to FDMA and TDMA techniques, wireless communications systems may employ Code Division Multiple Access (CDMA) or "spread spectrum" techniques. In a CDMA system, a channel is defined by modulating a data-modulated carrier signal by a unique spreading code, i.e., a code that spreads an original data-modulated carrier over a wide portion of the frequency spectrum in which the communications system operates. The transmitted signal is demodulated by a receiver unit using the same spreading code using signal correlation techniques. Because the transmitted signal is spread across a wide bandwidth, CDMA communications can be less vulnerable to coherent noise sources which might "jam" other communications signals. The use of the unique spreading code allows several channels to effectively share the same bandwidth.

The quality of service provided by a wireless communications systems such as cellular systems is subject to environmental effects. For example, a cellular radiotelephone call placed under system operating parameters designed to produce an acceptable level of communications quality under a set of nominal environmental conditions can be disrupted by fading, shadowing by intervening objects such as hills, and attenuation by distance and by structures such as buildings. Such environmental factors can result in service outages.

An example of such a service disruption occurs when a mobile radiotelephone enters an outage region of a cellular radiotelephone system. Such a region might include a hole in cellular coverage between cells, or an area of degraded reception or transmission within a cell, such as the interior of a building or a tunnel. When the mobile radiotelephone enters such a disadvantaged location, it may be unable to continue a call in progress, to receive notification of an incoming call, or to place an outgoing call.

A wireless communications system can be designed to reduce service disruptions by simply increasing transmit power. Increasing transmit power can be problematic, however. Increasing transmit power can lead to increased interchannel interference. This can be particularly true in CDMA systems, in which it is generally desirable to balance signal power. In addition, increasing transmit power tends to be impractical for mobile units, as these units typically are power-limited due to size and battery constraints.

In cellular systems, another approach to reducing service outages is to increase the density of cells, i.e., of base stations, so that areas falling between cells are reduced. This approach, however, can lead to increased network complexity, along with increased capital and operational costs associated with the need for additional base stations.

Another approach for providing improved service to subscriber units in disadvantaged locations is to provide a selective high-power paging system that can contact such units of an incoming call. In such a system, a base station sends a paging message to a disadvantaged unit over a specially-designated high power channel. The paged unit can then move to a less disadvantaged location in order to answer the page.

Although this approach can provide high-penetration notifications, this approach generally supports only a small number of users requiring the high-penetration service, as the system is still constrained by the interference concerns described above. Moreover, it may be impractical for a receiving unit typically to acknowledge such high-power messages while in disadvantaged locations. U.S. patent application Ser. No. 08/989,088, assigned to the assignee of the present application, describes a technique for responding to a high-power message which involves sending a simplified acknowledgement comprising a series of binary "1s" over a normal-power channel. However, the information that the mobile unit can transmit according to this technique can be limited.

SUMMARY OF THE INVENTION

In light of the foregoing, it is an object of the present invention to provide wireless communications systems and methods that can reduce service outages.

It is another object of the present invention to provide wireless communications systems and methods for providing communications to subscriber units located in disadvantaged service areas.

It is another object of the present invention to provide more robust communications systems and methods for communicating with subscriber units in disadvantaged service areas without requiring increased transmit power or increased bandwidth usage.

It is yet another object of the present invention to provide apparatus and methods for providing more robust communications with subscriber units in a wireless communications system without requiring drastic modifications to the wireless communications system.

These and other objects, features and advantages are provided according to the present invention by radio communications apparatus and methods in which messages are communicated over a high-penetration channel that provided increased reliability without requiring increased transmit power or bandwidth. In embodiments of the present invention, a base station or subscriber unit transmits information on at least one of a first communications channel at a first redundancy level and a second communications channel at a second redundancy level greater than the first redundancy level.

In a preferred embodiment, the second channel provides additional orthogonal or quasi-orthogonal coding that can improve signal to noise ratio and that maps the normal M-ary modulation of the transmitting unit into a binary modulation that produces a radio communications signal that can be demodulated at a receiving unit using non-coherent detection techniques. A radio communications signal is received at a receiving unit on one of the two communications channels, and is coherently or non-coherently demodulated based on which channel the signal is received. The information preferably is transmitted over either of the first and second communications channels using substantially the same amount of spectral resource and substantially the same amount of power.

In another embodiment, short messages are sent over a Digital Control Channel (DCCH) per an IS-136 standard, and short messages are also transmitted over a high-penetration control channel (HPCCH) utilizing a layered protocol similar to that used for the DCCH, but including the additional coding between the Data Link Layer and the Physical Link Layer.

The present invention offers several advantages over conventional systems. Because transmit power and bandwidth do not have to be increased to achieve higher signal penetration to communicate with units in disadvantaged locations, the interference and power problems described above can be avoided. Because increased transmit power is not required, high-penetration messaging according to the present invention can be practically implemented in either base stations or subscriber units such as mobile terminals. The high-penetration messaging services can be implemented with minimal changes to existing hardware and protocols.

In particular, according to the present invention, in a wireless communications system, a message, e.g., a control message, a short message, a voice message and a data message, is transmitted, for example, from a cellular base station, on at least one of a first communications channel having a first redundancy level or a second communications channel having a second redundancy level greater than the first redundancy level. A radio communications signal is received on one of the first communications channel and the second communications channel at, for example, a mobile terminal. The received radio communications signal is demodulated to recover the message using a first demodulation scheme if the radio communications signal is received on the first communications channel and using a second demodulation scheme if the radio communications signal is received on the second communications channel.

According to an aspect of the present invention, the received radio communications signal is coherently demodulated if the radio communications signal is received over the first communications channel and non-coherently demodulated if the radio communications signal is received over the second communications channel. According to another aspect, the message is transmitted on the first communications channel using a first modulation constellation, and transmitted on the second communications channel using a second modulation constellation representing a subset of the first modulation constellation.

In other embodiments of the present invention, a first radio communications signal is transmitted representing the message encoded according to one of a first code that is operative to produce the first redundancy level or a second code that is operative to produce the second redundancy level. The second code may represent a concatenation of the first code and an additional code, such as an orthogonal code or a quasi orthogonal code.

In still other embodiments of the present invention, transmission of the message is preceded by formatting the message into a Data Link Layer frame that conforms to a Data Link Layer protocol. The first Data Link Layer frame is then encoded according to one of the first code or the second code to generate an encoded message, and a radio communications signal is generated from the encoded message.

According to yet another aspect of the present invention, the message is transmitted on the first communications channel using a first amount of spectral resource, and transmitted on the second communications channel using a second amount of spectral resource that is substantially the same as the first amount of spectral resource. The message may also be transmitted on the first and second channels at substantially the same transmission rate and/or power level.

A wireless communications system according to another aspect of the present invention includes means for transmitting a message on at least one of a first communications channel having a first redundancy level or a second communications channel having a second redundancy level greater than the first redundancy level. Means are provided for receiving a radio communications signal on one of the first communications channel and the second communications channel. Means are also provided for demodulating the received radio communications signal to recover the message using a first demodulation scheme if the radio communications signal is received on the first communications channel and using a second demodulation scheme if the radio communications signal is received on the second communications channel. The means for demodulating may comprise means for coherently demodulating the received radio communications signal if the radio communications signal is received over the first communications channel and means for non-coherently demodulating the received radio communications signal if the radio communications signal is received over the second communications channel. The means for transmitting may comprise means for transmitting on the first communications channel using a first modulation constellation, and means for transmitting on the second communications channel using a second modulation constellation representing a subset of the first modulation constellation.

Related transmitting and receiving apparatus for use in base stations, mobile terminals and other wireless communications units are also described.

DETAILED DESCRIPTION OF EMBODIMENTS

Figure 1:
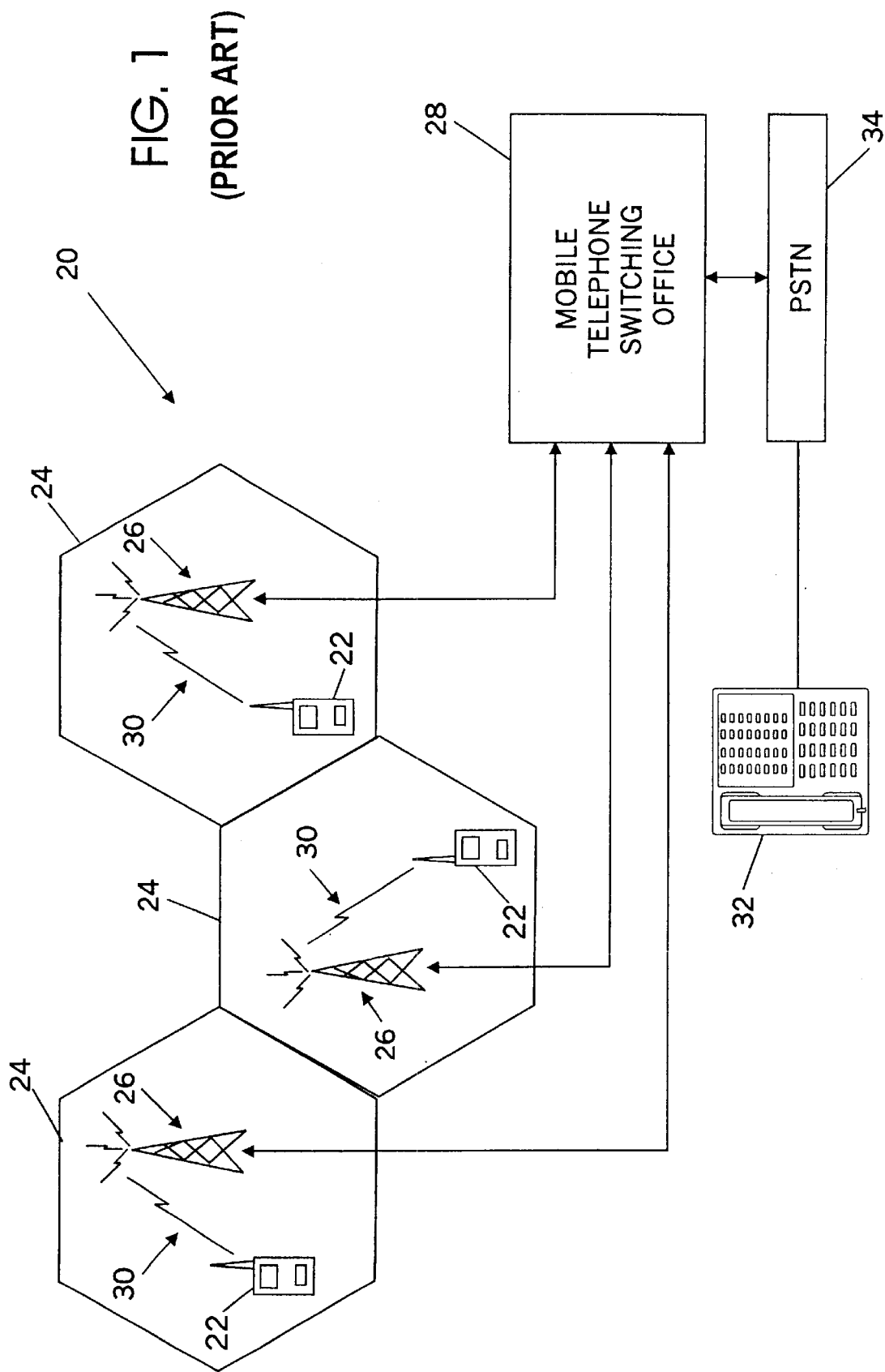
FIG. 1 illustrates a conventional terrestrial cellular radiotelephone communications system.
Figure 2:
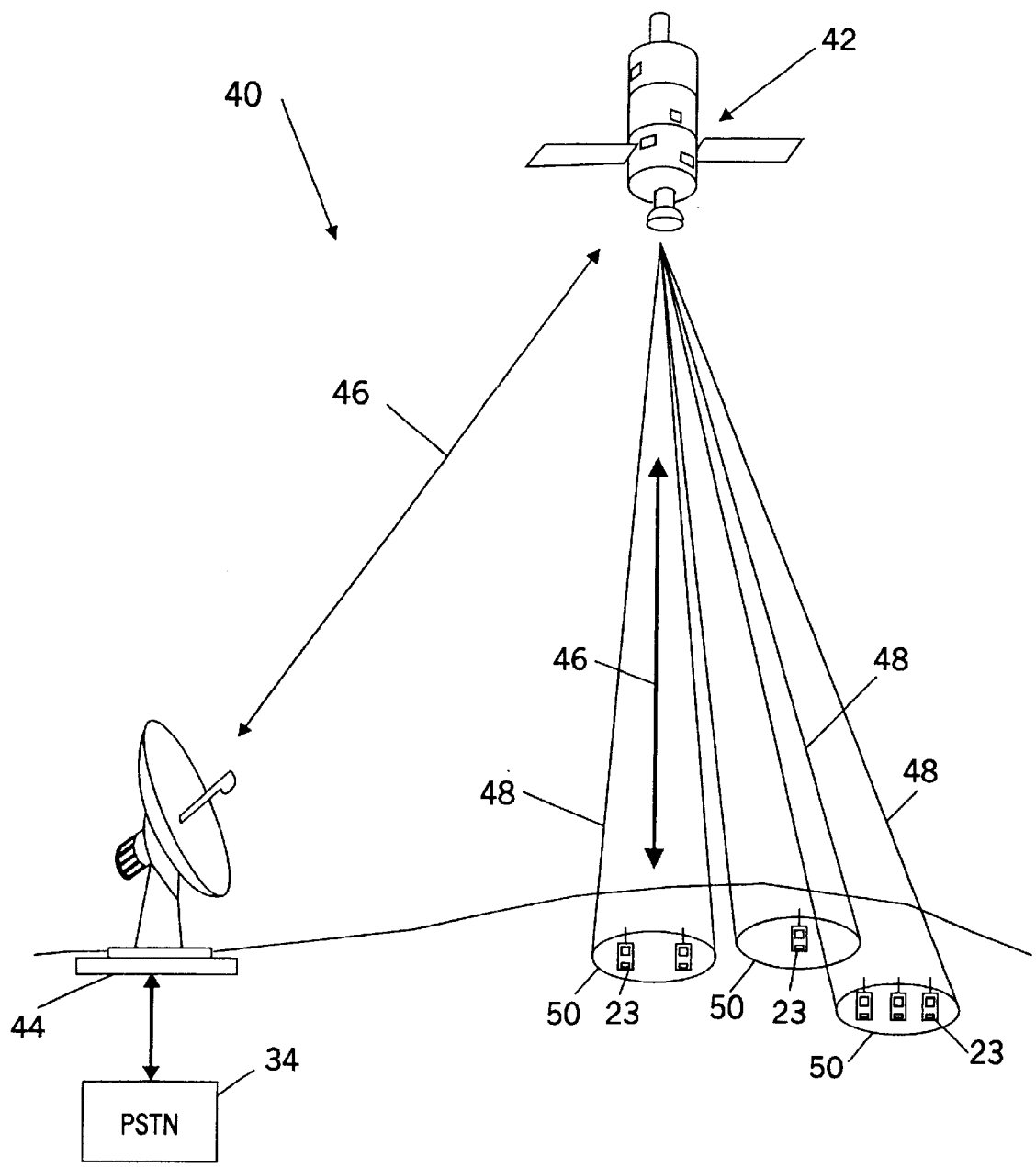
FIG. 2 illustrates a conventional satellite-based cellular radiotelephone communications system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present application relates to communication over channels in wireless communications systems such as cellular radiotelephone systems. As those skilled in the art will appreciate, terms such as "channel" are not always consistently used in the literature; for example, the *IEEE Standard Dictionary of Electrical Terms* defines a "channel" as both a communications path and a band of frequencies. In a conventional FDMA system, for example, a "channel" may refer or corresponds to a "physical" channel comprising a band of frequencies occupied by a modulated carrier. In a TDMA system such as GSM, a physical channel may comprise a group of time slots on one or more frequency bands, for example, the periodic time slots on particular frequency bands that are allocated to the so-called "common channels." In some contexts, a "channel" may be a "logical channel" defined by an addressing or frame field assignment scheme that may have no particular correlation to the frequency or time of transmission. For purposes of the present application herein, however, "channel" refers to a communications path defined in a communications interface such as the air interface of a wireless communications system, whether it be an actual physical channel comprising a frequency band, a time slice thereof, or the like, or a logical channel carried by such a physical channel.

"Frequency band" as used herein refers to a frequency range over which a communications signal, e.g., a modulated carrier signal, is distributed. This band may be, but need not necessarily be, centered about a central carrier frequency. Those skilled in the art will appreciate that the carrier frequency bands described herein need not be non-overlapping or contiguous; for example, modulated carriers typically may overlap in their spectral distributions without producing unacceptable levels of interference. In fact, in some systems the overlap may be sizable.

The embodiments discussed herein relate to a wireless communications system in which "short messages," e.g., alphanumeric messages such as those conforming to standards such a GSM or IS-136, are transmitted on at least one of a "normal" communications channel having a first channel coding that produces a first redundancy level or a "high penetration" communications channel having a second channel coding that produces a second redundancy level that is greater than the first redundancy level. Those skilled in the art will appreciate, however, that the apparatus and methods of the present invention are also applicable to the communication of other types of messages, such as control messages, voice or data.

The embodiments described herein also relate to time-division multiple access (TDMA) wireless communications systems, in particular, IS-136 (DAMPS) systems. Those skilled in the art will appreciate, however, that the apparatus and methods of the present invention are also applicable to other types of TDMA systems, as well as to non-TDMA systems.

Figure 3:
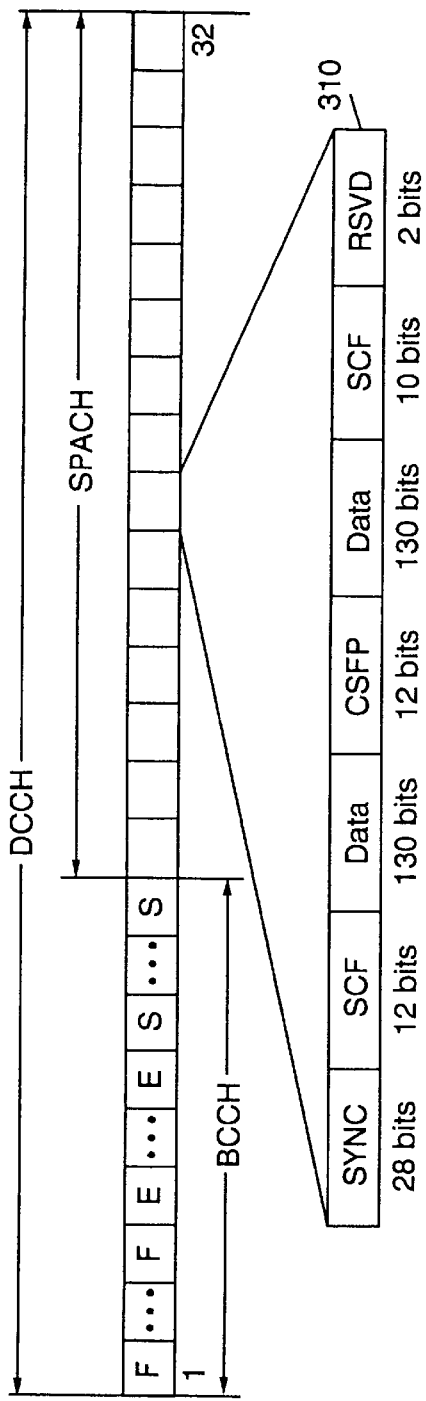
FIG. 3 illustrates a structure for an IS-136 Digital Control Channel (DCCH).

An Exemplary Wireless Communications System with a High-Penetration Messaging Capability In a wireless communications system conforming to the IS-136 standard, short messages are communicated over a Digital Control Channel (DCCH). FIG. 3 illustrates an IS-136 Digital Control Channel DCCH configuration. The Digital Control Channel DCCH is a "physical channel," that is, an actual portion of a signal propagation resource defined in terms of frequency and time divisions. Several "logical" channels are mapped onto the Digital Control Channel DCCH. These logical channels include a multiplexed Broadcast Channel BCCH designed to convey information about system configuration and system access rules, and a multiplexed point-to-point short message service (SMS), paging and access response channel SPACH.

The Broadcast Channel BCCH is further divided into logical channels. These logical channels include a Fast Broadcast Channel (F-BCCH) F for conveying time-critical information such as system identification (ID) and registration information, an Extended Broadcast Channel (E-BCCH) E for conveying less time critical information such as neighboring cell lists, and an SMS Broadcast Channel (SMS-BCCH) S. The combined SMS, paging and access response channel SPACH comprises a short message service channel (SMSCH) for carrying messages, a paging channel (PCH) for conveying system pages, and an access response channel (ARCH) for providing system response to queries from subscriber units and other administration information.

The slots of each Digital Control Channel DCCH frame start with F-BCCH slots F, followed by E-BCCH slots E, S-BCCH slots S and then the SMS, paging and access slots SPACH. The number of each type of slot in each frame is determined by system setup. As illustrated, each slot 310 of the Digital Control Channel DCCH includes 28 synchronization bits SYNC, 12 Shared Channel Feedback bits SCF bits for supporting a Random Access Channel (RACH), 260 data bits Data, 12 Coded Super Frame Phase bits CSFP for detecting the phase of the Super Frame, and 2 reserved bits RSVD.

A DCCH Super Frame (SF) includes 32 Digital Control Channel DCCH frames. When a subscriber unit such as a mobile radiotelephone first is turned on, the unit's receiver electronics search for a DCCH by reading the CSFP; if the CFSP is changing, the mobile unit has acquired the DCCH. From the CSFP the mobile unit can determine which slot is the first slot in the Super Frame, which allows the unit to then read the F-BCCH. The F-BCCH conveys information regarding the number of F-BCCH, E-BCCH and S-BCCH slots are present in the Super Frame. The mobile unit receives paging group information on the E-BCCH. Once this information is received, the mobile can determine which SPACH slot carries paging and SMS information directed to it. The mobile unit then reads the identified slot once per Super Frame to monitor for the presence of an incoming page or a short message. This periodic reading allows for the creation of a sleep mode cycle, i.e., the mobile can conserve power during times when it is not required to be actively monitoring for the arrival of a page or short message during its assigned slot.

A Hyper Frame includes two Super Frames, with the second Super Frame of a Hyper Frame being a repeat of the first Super Frame. If a subscriber unit is unable to read its slot in the SPACH in the first Super Frame of a Hyper Frame, it can attempt to read it again during the second Super Frame. If the subscriber unit is able to read its assigned SPACH slot in the first Super Frame, however, it can skip reading the second super Frame.

Figure 4:
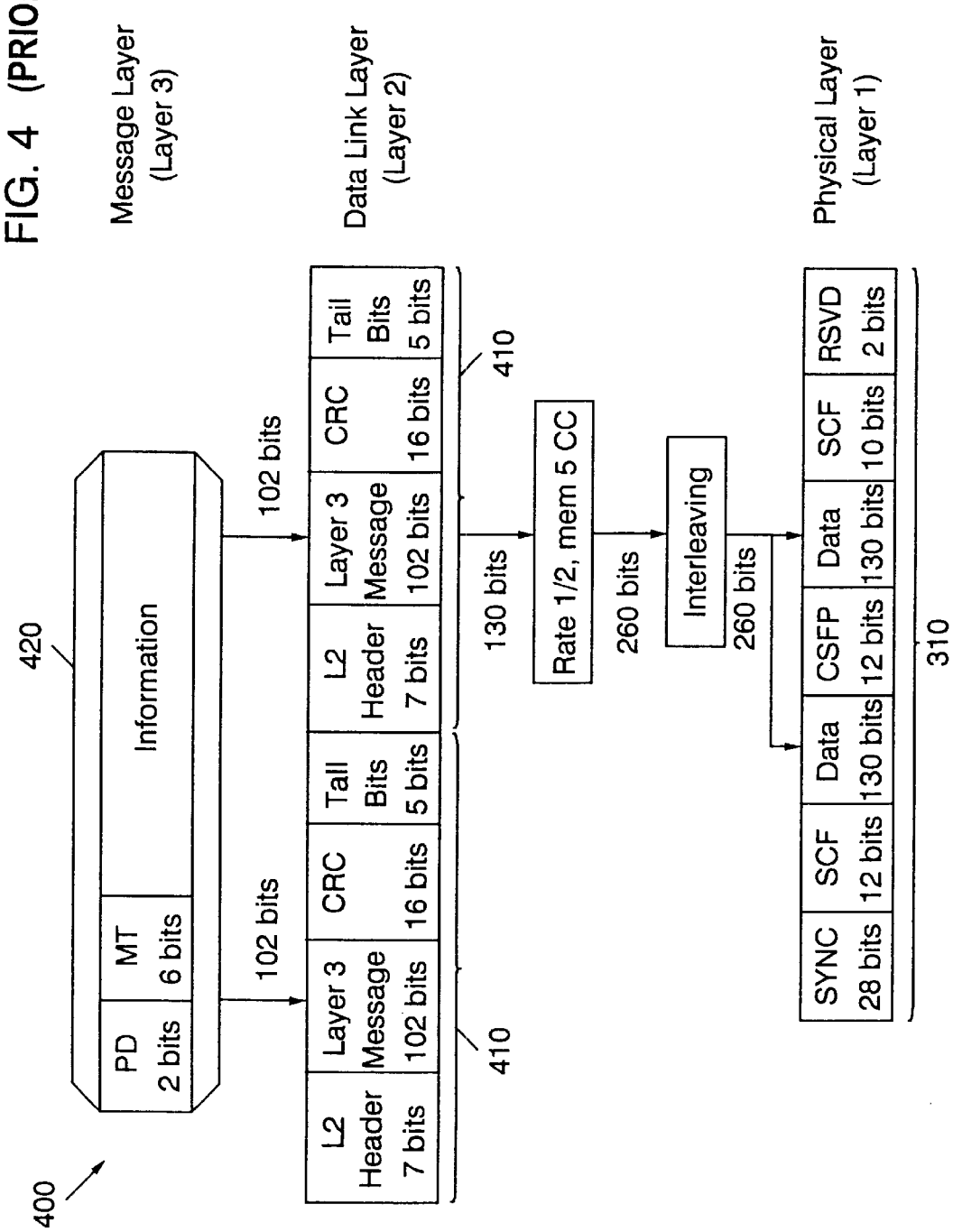
FIG. 4 illustrates a protocol stack for generating an IS-136 DCCH.

FIG. 4 illustrates a protocol stack 400 for generating a DCCH. A Data Link Layer (Layer 2) frame 410 includes a 7-bit header, 102 message bits, a 16-bit cyclic redundancy check (CRC) value, and 5 tail bits that are used for convolutional coding. The 130 bits of a Data Link Layer frame 410 are encoded according to a rate ½ convolutional code and then interleaved to produce 260 bits, which are then formatted and supplement to form a Physical Layer (Layer 1) slot 310. The Data Link Layer frame 410 is generated from a Message Layer (Layer 3) message 420 that includes a 2-bit protocol discriminator (PD) field and a 6-bit message type (MT) field.

The information in the Message Layer message 420 can be of variable length, depending on the particular message being sent. If the information in a given Message Layer message extends beyond 102 bits, multiple Data Link Layer frames 410 are used to transmit the Message Layer message 420. Accordingly, information in a Message Layer message 420 may be transmitted using a number of Physical Layer slots 310. When information in a Message Layer message extends beyond 102 bits, the message is typically transmitted using every other SPACH slot, with a bit in the header of each Data Link Layer frame 410 being set to a predetermined value to tell units in the particular paging group to look at every other SPACH slot for paging or SMS messages. In this manner, messages can be efficiently transmitted while reducing paging delays to units in other paging groups.

Figure 5A:
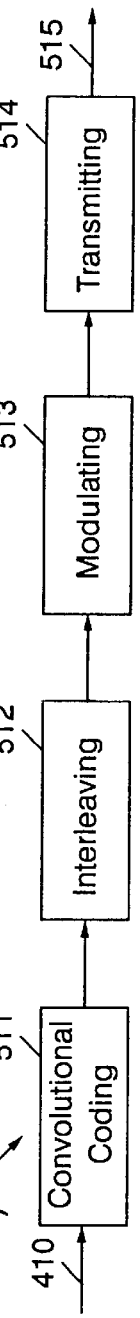
FIGS. 5A–B illustrate respective transmitter and receiver structures for an IS-136 system.
Figure 5B:
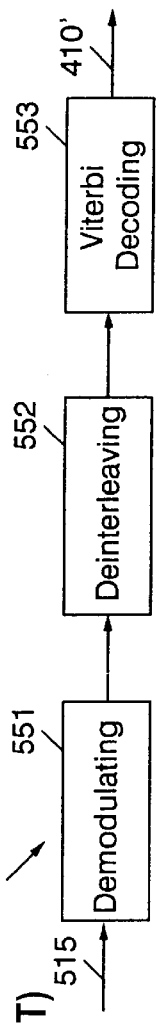

FIGS. 5A and 5B illustrate an exemplary transmitter structure 510 and an exemplary receiver structure 550, respectively, for communicating messages under a conventional standard such as IS-136. Referring to FIG. 5A, a Data Link Layer frame 410 is convolutionally encoded by convolutional coding means 511, with the convolutionally encoded bit stream then being interleaved by interleaving means 512. The encoded and interleaved bits are then modulated by modulating means 513, e.g., a π/4-DQPSK modulator. The output of the modulator 513 is then passed on to transmitting means 514 which transmits a corresponding radio communications signal 515.

Referring to FIG. 5B, the radio communications signal 515 is then received and coherently demodulated by coherent demodulating means 551 to produce a demodulated signal. The demodulated signal is then de-interleaved by de-interleaving means 552 and decoded by Viterbi decoding means 553 to produce a Data Link Layer frame 410' that represents an estimate of the originally transmitted Data Link Layer frame 410.

According to an aspect of the present invention, a "high-penetration" messaging service is provided in addition to a conventional messaging service such as that described above to allow communication with a subscriber unit when it is in a disadvantaged location, such as location falling between normal cell coverage regions or a location inside a building or other structure. The high penetration messaging service is provided by using a separate high-penetration channel that utilizes substantially the same transmission rate and power, and thus the substantially the same amount of spectral resource, as the normal messaging channel. The high-penetration channel, however, uses additional coding to provide higher redundancy and which allows the use of non-coherent detection techniques. The additional coding also preferably allows the use of common transmitter elements and receiver elements for both the normal messaging channel and the high-penetration channel.

Figure 6A:
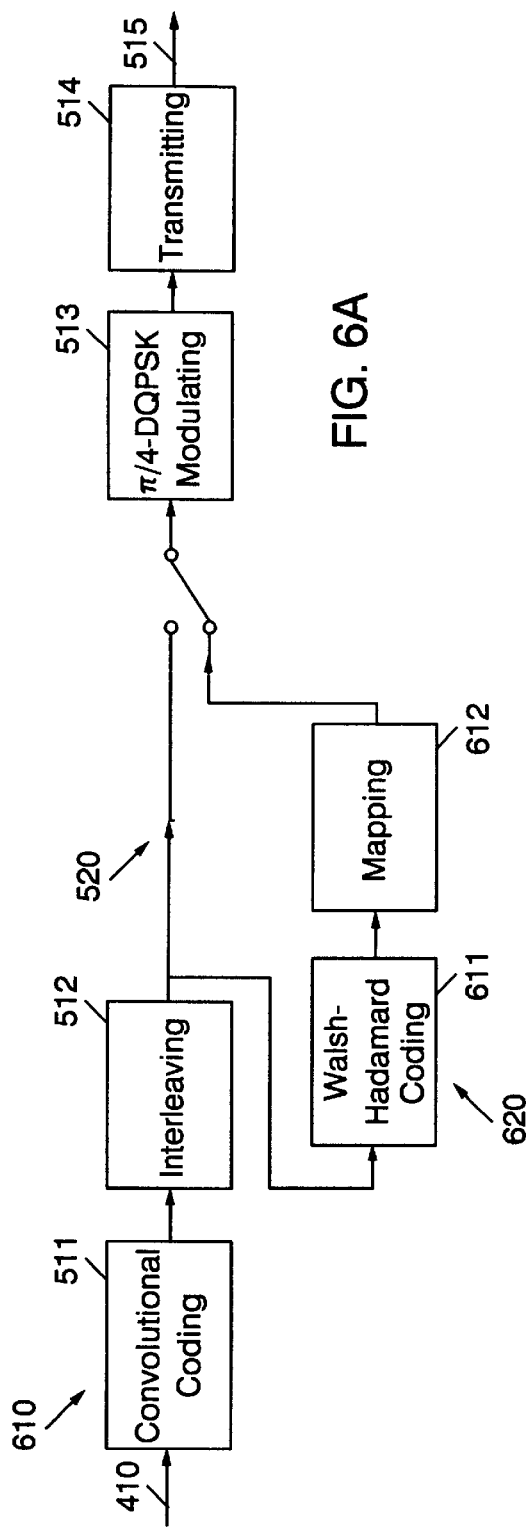
FIGS. 6A–6B illustrate exemplary transmitting unit and receiving unit structures according to the present invention.
Figure 6B:
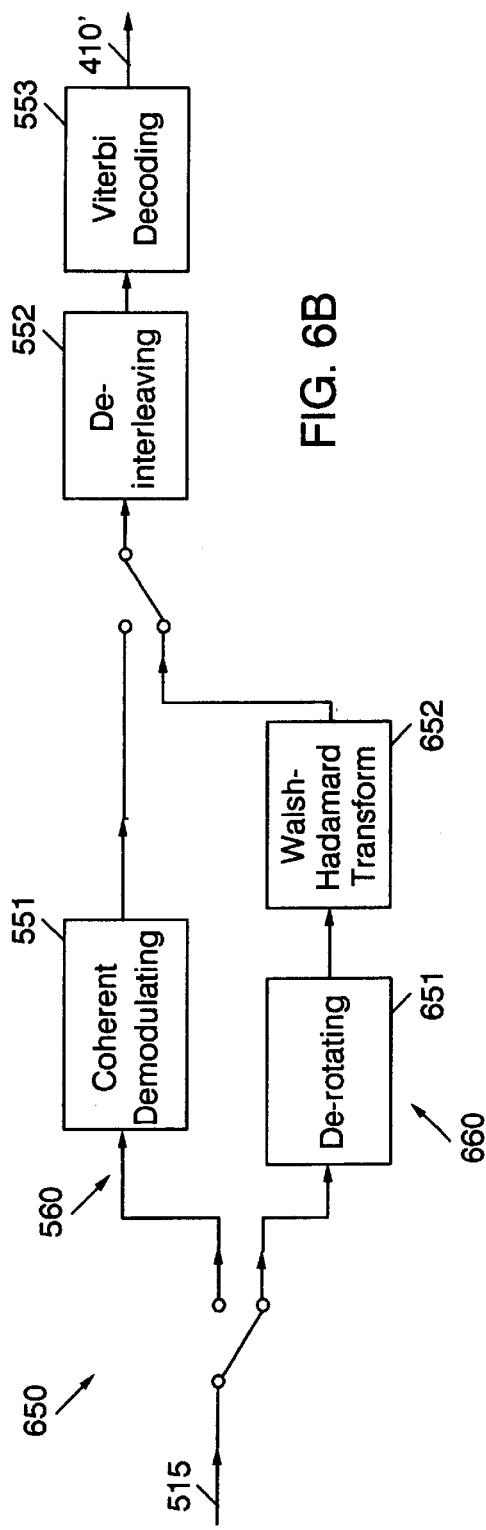

For example, as illustrated in FIGS. 6A and 6B, the additional coding may comprise an additional Walsh-Hadamard or other orthogonal or quasi-orthogonal code that introduces additional redundancy. An exemplary transmitting unit 610 includes convolutional coding means 511 and interleaving means 512. In a normal messaging channel 520, the interleaved and convolutionally encoded signal produced by the interleaving means 512 is supplied directly to a modulating means 513, e.g., a π/4-DQPSK modulator, for transmission by transmitting means 514. In a high-penetration channel 620, the interleaved and convolutionally encoded signal is additionally encoded by additional coding means 611, e.g., an encoder implementing a Walsh-Hadamard or other orthogonal or quasi-orthogonal code. The additionally encoded signal is mapped by mapping means 612 to produce a sequence that constrains the signal mapping of the modulating means 513 into a signal subset that produces a radio communications signal 515 that is amenable to non-coherent demodulation. An example of such a mapping is a bit repetition mapping that maps 4-level π/4-DQPSK modulation into a binary π/4-DBPSK modulation scheme, as described in a United States Patent Application entitled "High-Performance Half-Rate Coding Apparatus and Method for a TDM System," assigned to the assignee of the present application, filed Oct. 16, 1998, and incorporated by reference herein in its entirety as if the text is physically present.

As illustrated in FIG. 6B, a receiving unit 650 for receiving both normal and high penetration messages includes a coherent receiving branch 560 including means 551 for coherently demodulating a received radio communications signal 515, as well as a non-coherent receiving branch 660 including a de-rotating means 651 and a non-coherent demodulating means 652, e.g., a detector that implements a Walsh Hadamard transform. The output of the either the coherent receiving branch 560 or the non-coherent receiving branch 660 are then passed on to de-interleaving means 552 for de-interleaving and then to Viterbi decoding means 553 to recover a Data Link Layer frame 410' that represents an estimate of the originally transmitted Data Link Layer frame 410.

The additional coding preferably is an orthogonal or quasi-orthogonal code such as a Walsh-Hadamard or Nordstrom-Robinson code. The additional coding helps to raise the signal to noise ratio when communicating with a unit that is located in a disadvantaged location. The use of such a code with a mapping that maps the normal M-ary modulation into a binary modulation scheme that can be demodulated at the receiving terminal using non-coherent detection techniques. Coherent and non-coherent modulation techniques are well known to those skilled in the art. Several examples of these modulation techniques, as well as a discussion of Walsh-Hadamard and other codes may be found in *Digital Communications*, by Proakis, published by McGraw-Hill (3$^{rd}$ ed., 1995).

The use of noncoherent demodulation can avoid the need to perform channel estimation and tracking operations associated with coherent demodulation. Non-coherent demodulation is applied to an appropriately modulated signal, e.g., a differentially modulated, orthogonally modulated, quasi-orthogonally modulated, or similar signal. In a channel with significant delay spread, an appropriate demodulator is a so-called RAKE receiver, in which a received signal is correlated with each of the modulating sequences (e.g., the orthogonal, quasi-orthogonal, or other sequences used to produce the modulated signal), with different delays that model the delay spread of the channel. This and other demodulation techniques are described in the aforementioned text *Digital Communications*, by Proakis.

Those skilled in the art will appreciate that the components of the illustrated exemplary transmitting unit 610, i.e., the convolutional coding means 511, interleaving means 512, modulating means 513, and transmitting means 514, may comprise conventional transmission components typically found in base stations, mobile terminals or other similar communications apparatus. These components may include, for example, conventional transmitter circuits, antennas, processing circuits implemented in special purpose hardware such as an application-specific integrated circuit (ASIC) or in more general purpose hardware such as a digital signal processor (DSP), and the like. Similarly, elements of the receiving unit 6509, i.e., the coherent demodulating means 551, de-rotating means 651, non-coherent demodulating means 652, de-interleaving means 552, and Viterbi decoding means 553, may comprise conventional receiving components commonly used in base stations, mobile terminals and the like. These components may include, for example, conventional antennas, mixers, signal and other processing circuits implemented in special purpose hardware such as an application-specific integrated circuit (ASIC) or in more general purpose hardware such as a digital signal processor (DSP) or microprocessor, and the like. Those skilled in the art will appreciate that, in general, the transmitting unit 610 and the receiving unit 650 may be implemented using special purpose analog or digital hardware, software running on general-purpose hardware, or combinations thereof Those skilled in the art will also appreciate that the structures of FIGS. 6A and 6B may be implemented in either base stations or subscriber terminals of a wireless communications system. For example, the normal and high-penetration messaging channels may be configured to communicate short messages from a base station to a subscriber unit, or to convey short message acknowledgements from a subscriber unit to a base station. More generally, the normal and high-penetration messaging channels may be used to provide voice and data messaging in either direction.

Figure 7:
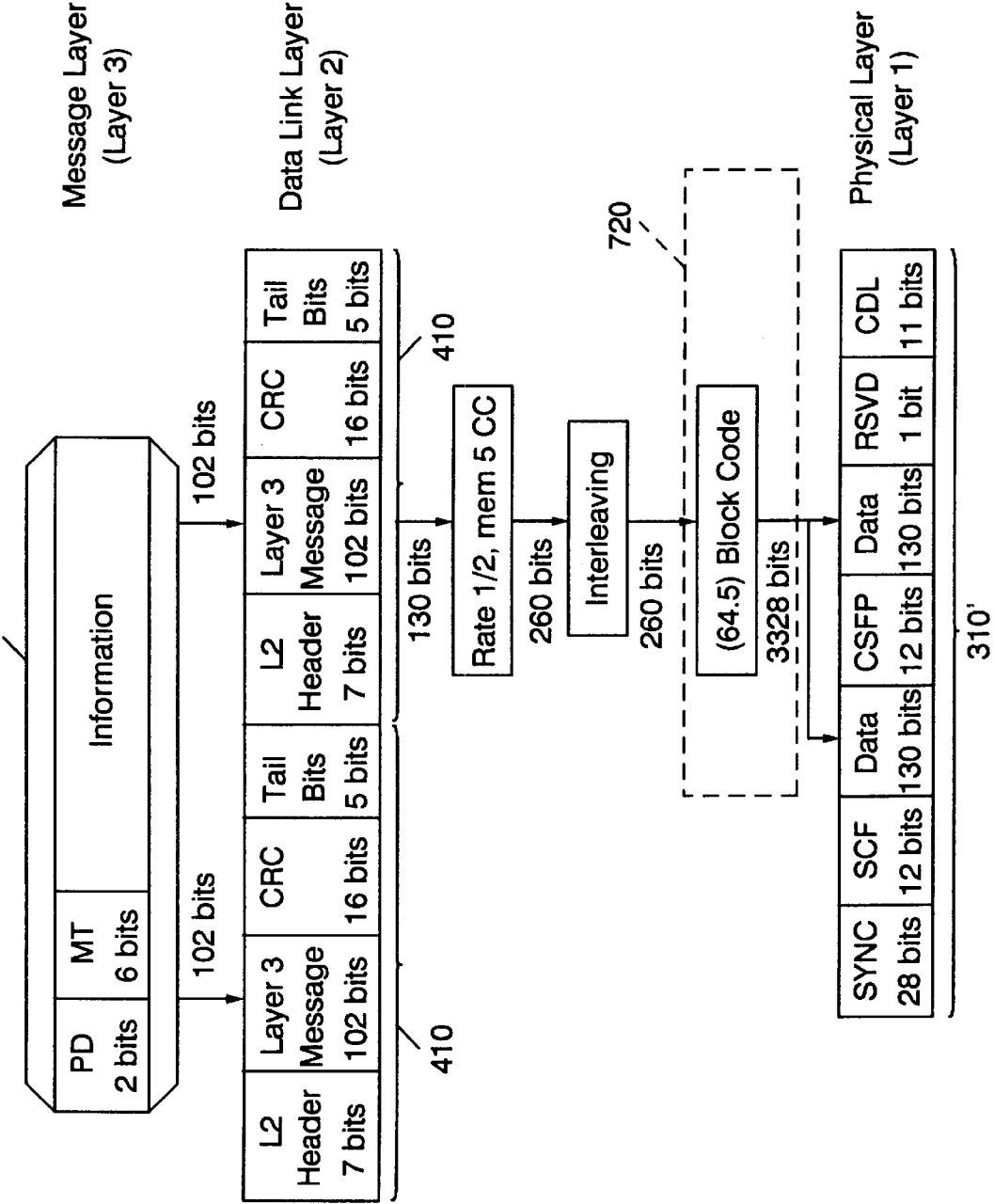
FIG. 7 illustrates an exemplary protocol stack for generating high penetration messages according to an aspect of the present invention.

A protocol stack for implementing a high-penetration channel in an IS-136 compatible system is illustrated in FIG. 7. A Message Layer message 420 is formatted into a Data Link Layer frame 410 as described in reference to FIG. 5. In forming a modified high-penetration Physical Layer slot 720, however, an additional coding operation 710, here a (32,5) Walsh-Hadamard coding, is applied to increase redundancy in transmitting the information in the Message Layer message 420. The modified Physical Layer slot 310' includes a CDL field and a constant CSFP so that other units do not mistake the high-penetration slot 310' for a normal DCCH slot.

Figure 8:
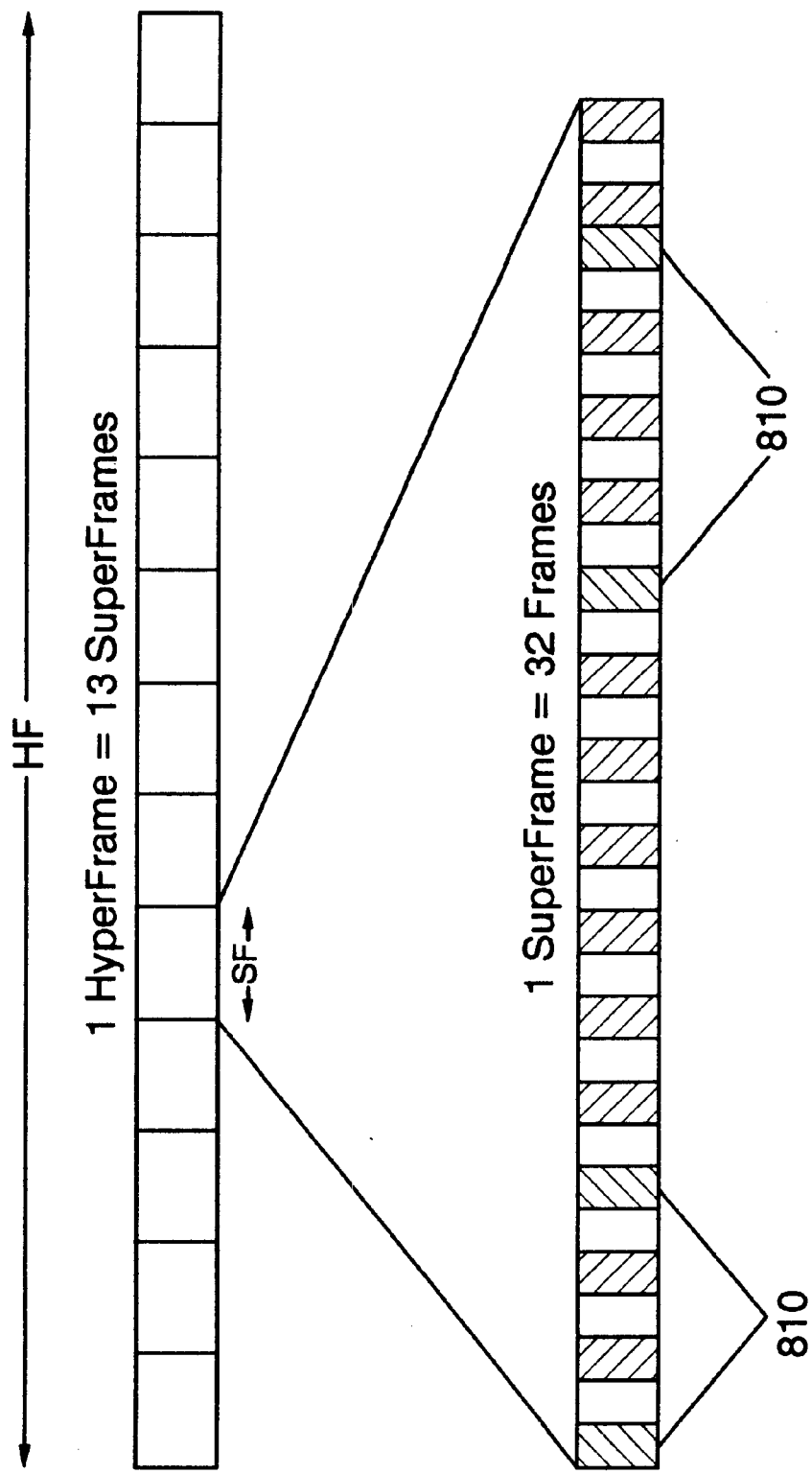
FIG. 8 illustrates an exemplary frame structure for a high penetration messaging channel according to an aspect of the present invention.

A different Super Frame structure may be used for the high-penetration messaging channel to enable the receiving unit to gain synchronization with the transmitting station. Accordingly, as illustrated in FIG. 8, 4 slots 810 are used for synchronization bursts in each Super Frame SF. The synchronization slots 810 can be used for both channel acquisition and fine synchronization. The synchronization slots 810 may be irregularly spaced throughout the Super Frame SF so that the receiving unit can identify the first slot in the Super Frame SF.

As a result of the increased coding, the information of a Message Layer message transmitted using a high-penetration channel is spread out over a larger number of Physical Layer slots than in a conventional messaging channel. For example, in the modified IS-136 structure illustrated in FIGS. 7 and 8, a Data Link Layer frame is requires 13 Physical Layer slots, i.e., a Hyper Frame HF includes 13 Super Frames SF. This can introduce a delay in recovering the message in relation to a message transmitted on a conventional messaging channel, but does not require changing the sleep mode cycle of the receiving unit, as the unit still can be constrained to be active for one slot in each Super Frame SF.

Figure 9:
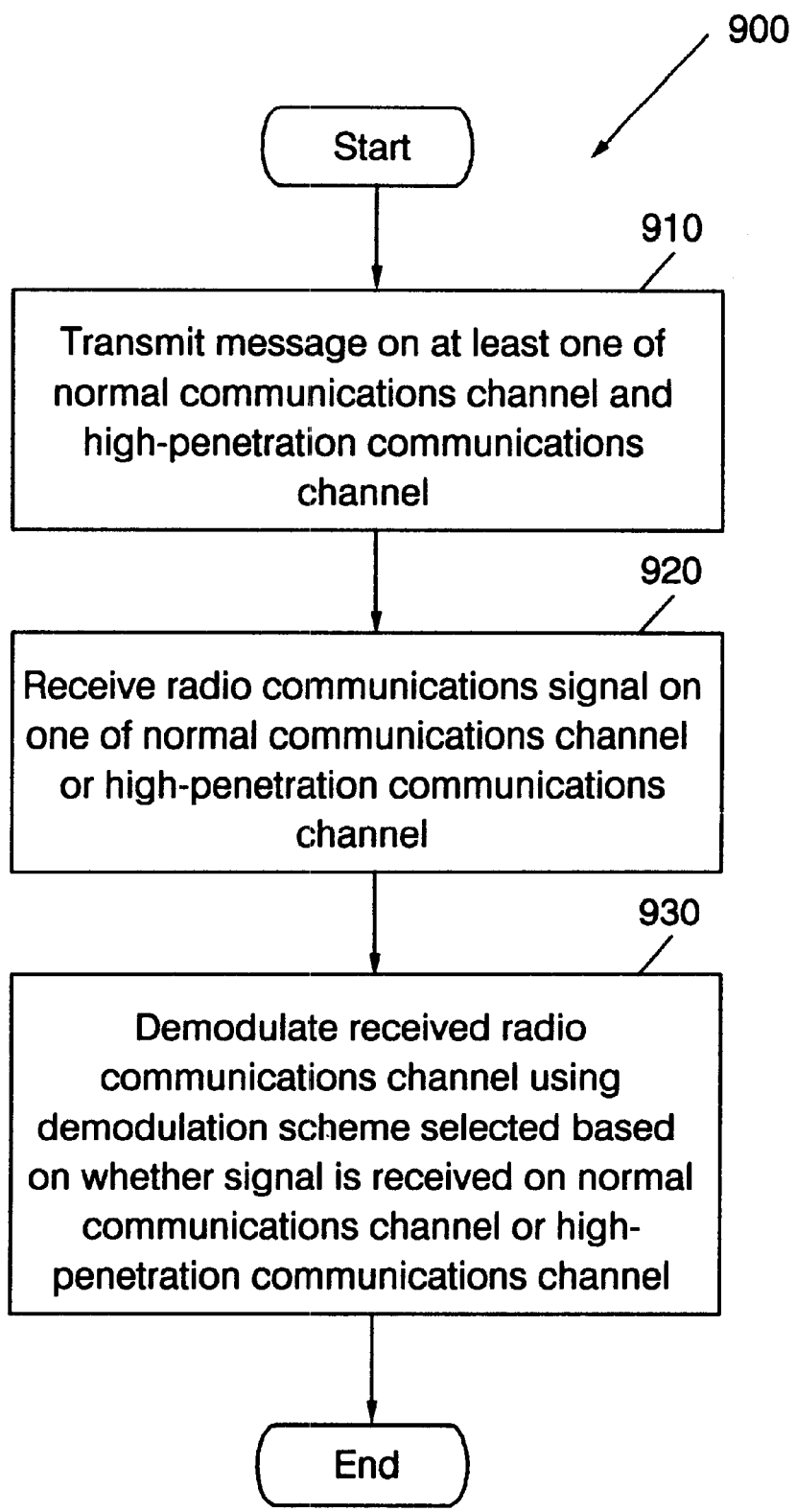
FIG. 9 illustrates exemplary operations for communicating messages over one of a normal and a high-penetration communications channel according to an aspect of the present invention.

FIG. 9 illustrates exemplary operations 900 for communicating messages using one of a normal messaging channel and a high-penetration messaging channel according to aspect of the present invention. A message is transmitted on one of normal communications channel or a high-penetration communications channel (Block 910). A radio communications signal is received on one of the normal communications channel or the high-penetration communications channel (Block 920). The received radio communications signal is demodulated using a demodulation scheme that is selected based on whether the radio communications signal is received on the normal communications channel or the high-penetration communications channel (Block 930).

Those skilled in the art will appreciate that the operations of FIG. 9 can be implemented in a number of different ways, and that specific steps for performing these operations may depend on the type of message being communicated. For example, broadcast control messages, e.g., messages containing system identification and synchronization information, may be concurrently transmitted by a base station on both a normal communications channel and a high-penetration communications channel so that subscriber units can acquire the system using one of the channels. A subscriber unit attempting to acquire the system might first tune to the normal channel and, failing to successfully receive the transmitted control information on that channel, retune to the high-penetration channel to gain access. Alternatively, in a point-to-point messaging context, a base station might transmit a message first on a normal communications channel in an attempt to reach a particular subscriber unit, and then transmit the message on the high-penetration communications channel in the event that an acknowledgement of the message transmitted on the normal channel is not received within a predetermined time. Methods and apparatus for switching between normal and high-penetrations channels are described in a related application entitled "Wireless Communications Standard and Robust Services and Methods of Operation Thereof," assigned to the assignee of the present invention, filed concurrently herewith, and incorporated herein by reference in its entirety.

Those skilled in the art will appreciate that the present invention is not limited to the illustrated embodiments of FIGS. 6A–B and 7–9. The methods and apparatus of the present invention are also applicable to the communication of other content than short messages; for example, similar techniques could be used to communicate short message acknowledgements, voice and data.

Other variations also fall with the scope of the present invention. For example, the actual data, e.g., the actual "bits" sent over the alternative normal and high-penetration channels need not be identical. As used herein, "message" refers to a quantum of information content. This content may be represented in a number of different ways, depending on the channel being used; for instance, information content contained in a Message Layer message transmitted over a normal channel may be represented in a streamlined or compact format on a high-penetration channel to reduce the negative effects of message delay over the high-penetration channel. An example of such a technique could involve sending a set of control information via a logical channel defined in a normal channel such as an IS-136 DCCH under normal conditions and, for purposes of simply maintaining contact with a unit in a disadvantaged location, a smaller subset of the set of control channel information may be transmitted on a high-penetration channel.

Simulation of a High-Penetration Messaging Service

A simulation of the performance of a high penetration messaging service such as that illustrated in FIGS. 6A and 6B was performed in order to assess performance under multi-path Rayleigh fading and delay spread typical for a DAMPS environment.

For demodulation in the presence of significant delay spread, a RAKE receiver structure may be used in which the received signal is correlated with each of the modulation sequences, e.g., the Hadamard sequences described above, with different delays, the different delays modeling the delay spread. The correlation outputs are then combined to generate an estimate of the received sequence.

A nonlinear optimal combination technique is described in Chapter 4 of *CDMA, Principles of Spread Spectrum Communication*, by A. Viterbi, published by Addison-Wesley (1995), which involves the use of additional information about the signal to interference level at each delay, information which may be difficult to obtain. Absent this information, a well-known technique is to add the energies of the correlation outputs corresponding to a given sequence, as described in Chapter 7 of *Digital Communications* by Proakis. If delay spread is low with respect to symbol duration, the non-coherent demodulation may be simplified to include a single correlation for each sequence, without delays.

For the single correlation case, a correlation output $m_i$ is produced for each sequence $c_i$:

$$m_i = |r^H c_i|,$$

where r denotes the received signal and c denotes the ith sequence, e.g., the ith Hadamard sequence. To generate an estimate ĉ of a received sequence, the receiver identifies the sequence of the set of modulation sequences that has the greatest $m_i$:

$$\hat{c} = \arg_{c_i} \max m_i.$$

Each modulation sequence corresponds to a block of bits. For example, the (32,5) Walsh-Hadamard code described above maps each sequence to 5 bits. A simple mapping of an estimated received sequence ĉ involves producing the bits, e.g., "hard bits", of one of the modulation sequences, without any reliability information. It is well known, however, that reliability information can improve decoding performance, such as the performance of the convolutional decoder of FIG. 6B. For example, although a Viterbi decoder may utilize either hard or soft bits, it typically performs significantly better using soft information.

Accordingly, the correlation outputs $m_i$ can be processed to produce bit-for-bit reliability information. Chapter 4 of the aforementioned *CDMA, Principles of Spread Spectrum Communication* describes an optimal formula for producing soft information, and describes a simplification of this formula that includes identifying a set $S_0$ of all of the modulation sequences corresponding to a "0" in the a given bit position and set $S_1$ of all of the modulation sequences corresponding to a "1" in the same position. The soft value for each bit, e.g., for each bit of the 5 bits mapped by the (32,5) code, is given by:

$$s_j = \left(\max_{c_i in S_0} m_i^2\right) - \left(\max_{c_i in S_1} m_i^2\right).$$

An approximation used in simulating the performance of the system of FIGS. 6A and 6B is:

$$s_j = \left(\max_{c_i in S_0} m_i\right) - \left(\max_{c_i in S_1} m_i\right).$$

In the simulation, synchronization maintenance was also investigated. Synchronization maintenance may or may not be used, depending on how often synchronization bursts are inserted and how dispersive the channel is. Two approaches can be used for synchronization maintenance. These approaches can be used individually or combined.

In a first approach, a symbol sequence of length 31 extended to length 34 is placed in each physical layer slot for synchronization maintenance. Within a time interval that includes the optimal sampling point, an 8-times over-sampled received signal is correlated with the synchronization sequence. The sampling phase having the greatest correlation with the synchronization sequence is selected at the sampling point.

A second approach to synchronization maintenance involves demodulating at every sampling phase within the sampling interval. For each phase, the non-coherent detection metrics $c_i$ are accumulated and stored. The code word having the largest accumulated metric is selected and its corresponding soft values are passed on to the Viterbi decoder. This latter approach can avoid the need to modify the physical layer format by avoiding the insertion of synchronization information into the message fields.

Figure 10:
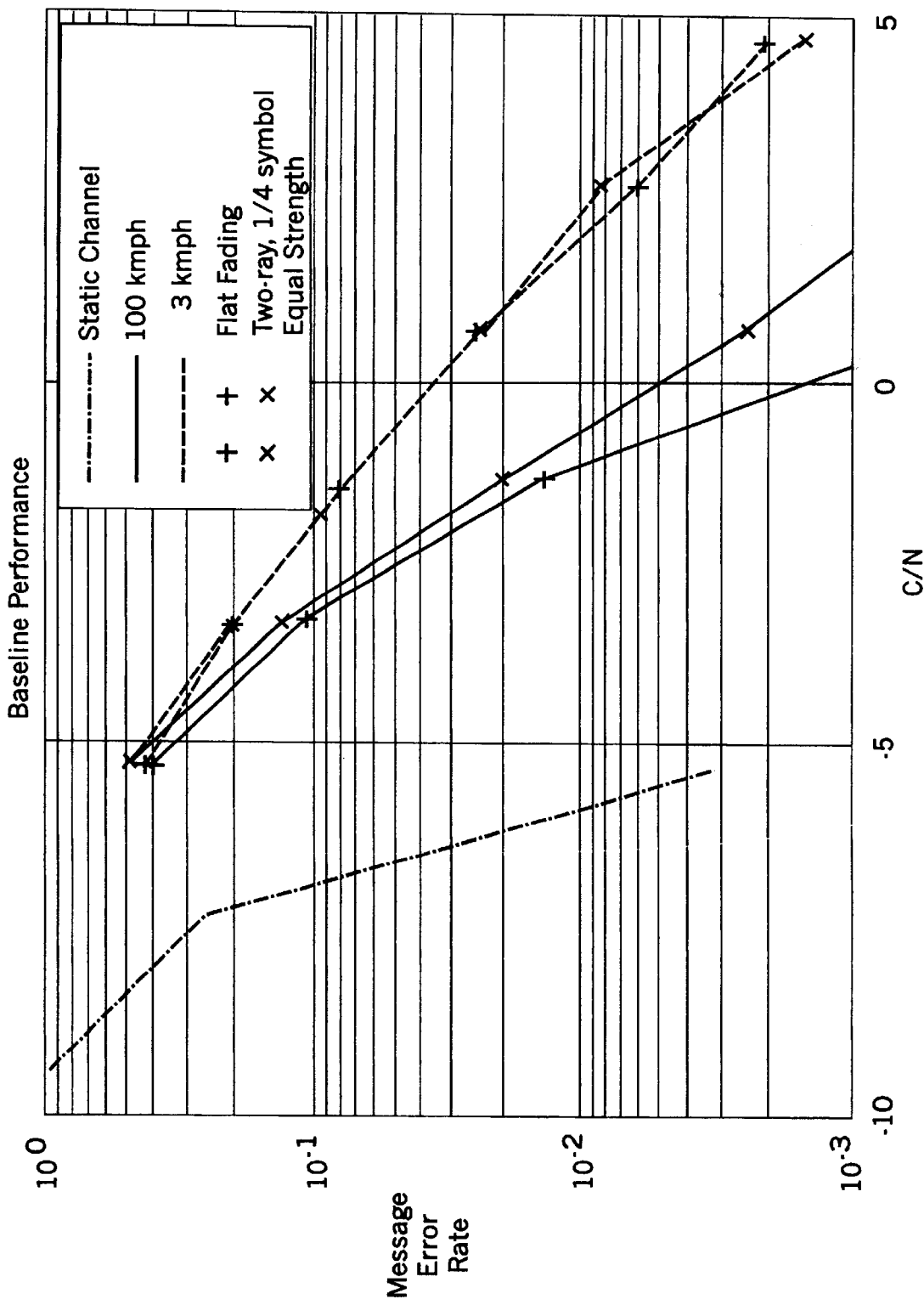
FIGS. 10–12 are charts illustrating simulated performance of a communications system according to an embodiment of the present invention.
Figure 11:
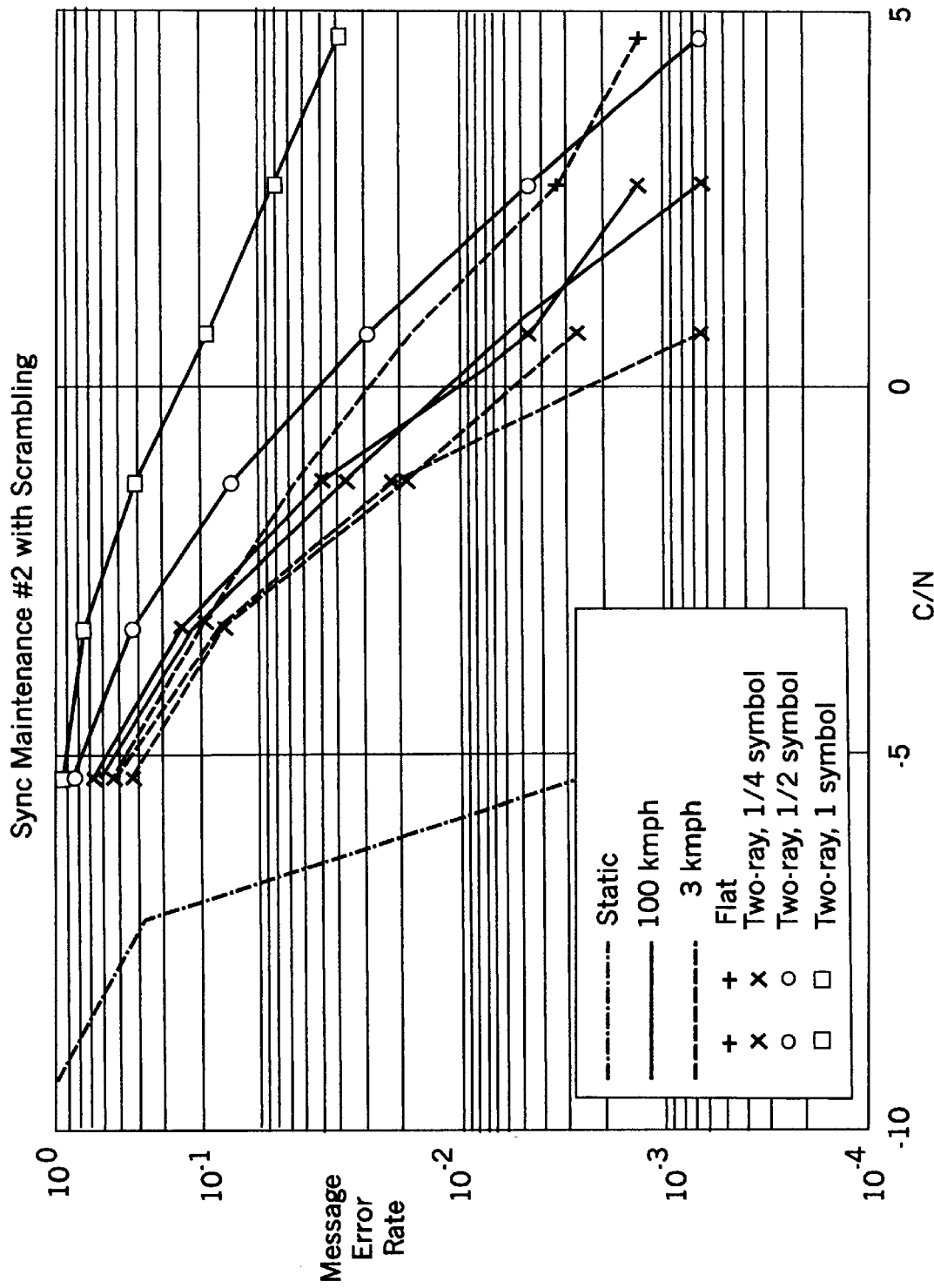

It is believed that delay spread rarely exceeds ¼ symbol in a DAMPS channel under normal propagation conditions. FIG. 10 illustrates baseline message error rates under normal conditions, showing that performance is minimally degraded due to a ¼-symbol delay spread. As illustrated in FIG. 11, additional scrambling can improve performance for a 1-symbol delay, but can actually degrade performance at other delay spread values.

Figure 12:
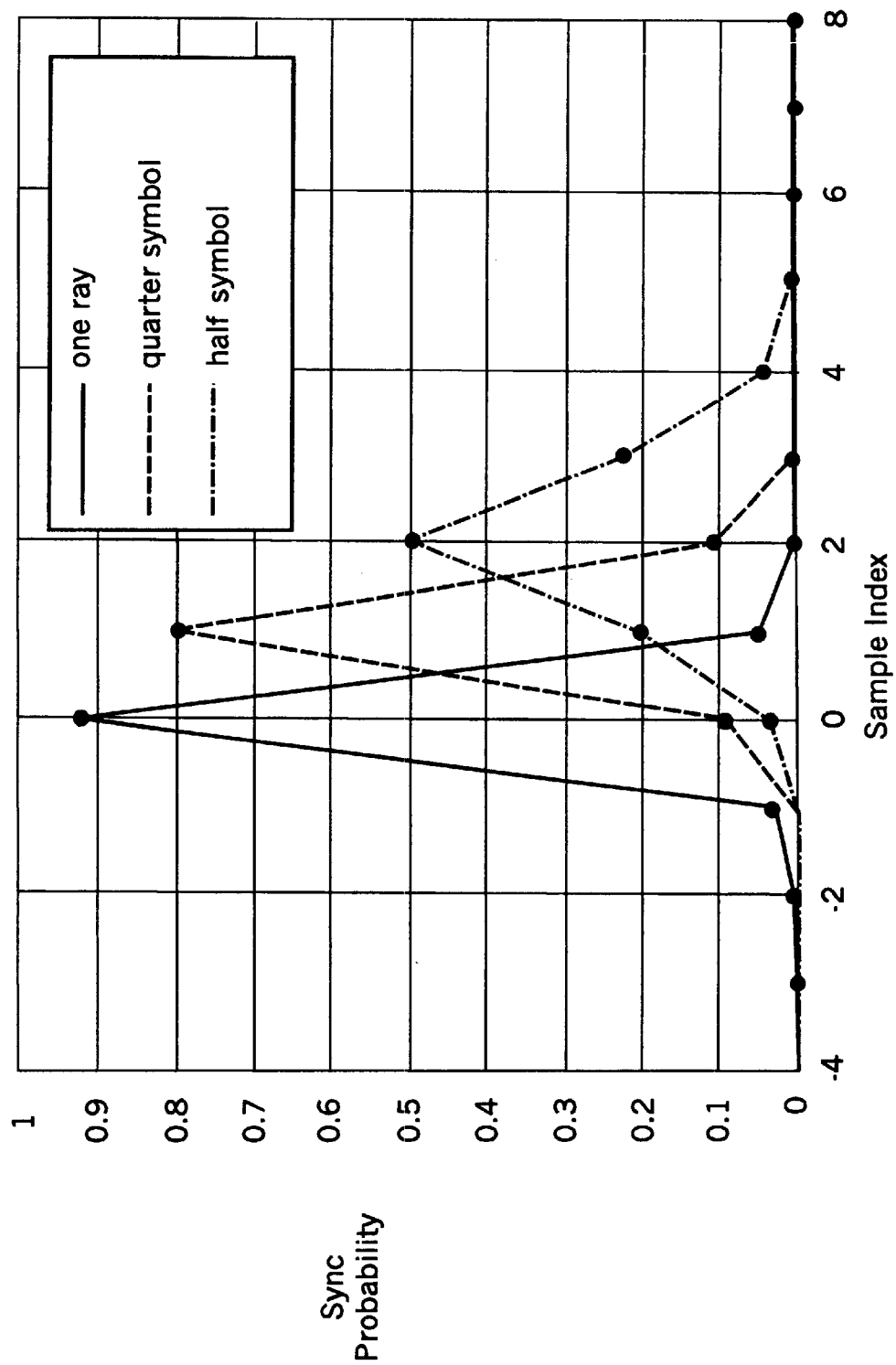

FIG. 12 illustrates initial synchronization performance in the presence of delay spread. Sample-spaced correlations with four consecutive synchronization bursts are accumulated non-coherently, and the location of the maximum accumulated value is used as the synchronization point. For a Rayleigh fading channel at 3 mph and a carrier to noise ratio (C/N) of −3 dB, the probability of choosing a synchronization point in the range of {−1, . . . , +1} for a single ray channel, where sample 0 indicates the position of the ray, is 0.997. For a two-ray channel with ¼ symbol delay, where samples 0 and 2 indicate the positions of the first and second rays, respectively, the probability of choosing a synchronization point in the range {−1, . . . , +3} is 0.999. With ½ symbol delay, where samples 0 and 4 indicate the positions of the first and second rays, respectively, the probability of choosing a synchronization point in the range {−1, . . . , +5} is 0.998. These results indicate that initial synchronization over the high-penetration channel can work well, even in the presence of significant delay spread.

Conclusion

According to the present invention, radio communications apparatus and methods are provided in which information is communicated over a high-penetration channel that can provide increased reliability without requiring increased transmit power or bandwidth. In embodiments of the present invention, a base station or subscriber unit transmits information on at least one of a normal communications channel at a first redundancy level and a high-penetration communications channel at a second redundancy level greater than the first redundancy level. In one embodiment, the high-penetration channel provides additional orthogonal or quasi-orthogonal coding that can improve signal to noise ratio and that maps the M-ary modulation shared by the normal communications channel and the high-penetration communications channel into a binary modulation that produces a radio communications signal that can be demodulated at a receiving unit using non-coherent detection techniques. A radio communications signal is received at a receiving unit on one of the two communications channels, and is either coherently or non-coherently demodulated based on which channel the signal is received. The information preferably is transmitted over either the normal or the high-penetration communications channel using substantially the same transmission rate and substantially the same amount of power, thus using substantially the same amount of spectral resource. In another embodiment, short messages are sent over a Digital Control Channel (DCCH) per an IS-136 standard, and short messages are also transmitted over a high-penetration control channel (HPCCH) utilizing a layered protocol similar to that used for the DCCH, but including the additional coding between the Data Link Layer and the Physical Link Layer.

The present invention can provide improved communications with units in disadvantaged locations while avoiding the interference and power problems of conventional high-penetration messaging techniques. Because increased transmit power is not required, high-penetration messaging can be practically implemented in either base stations or subscriber units such as mobile terminals. The high-penetration messaging services can be implemented with minimal changes to existing hardware and protocols.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system including at least one base station operative to serve a plurality of subscriber units, a method of communicating comprising the steps of:
   transmitting a message on at least one of a first communications channel having a first redundancy level or a second communications channel having a second redundancy level greater than the first redundancy level; and
   receiving a radio communications signal on one of the first communications channel and the second communications channel; and
   demodulating the received radio communications signal to recover the message using a first demodulation scheme if the radio communications signal is received on the first communications channel and using a second demodulation scheme if the radio communications signal is received on the second communications channel, wherein said step of demodulating comprises the step of coherently demodulating the received radio communications signal if the radio communications signal is received over the first communications channel and non-coherently demodulating the received radio communications signal if the radio communications signal is received over the second communications channel.

2. A method according to claim 1, wherein said step of transmitting comprises the steps of:
   transmitting on the first communications channel using a first modulation constellation; and
   transmitting on the second communications channel using a second modulation constellation representing a subset of the first modulation constellation.

3. A method according to claim 2, wherein the second modulation constellation provides binary modulation.

4. A method according to claim 1, wherein said step of transmitting comprises the step of transmitting a first radio communications signal representing the message encoded according to one of a first code that is operative to produce the first redundancy level or a second code that is operative to produce the second redundancy level.

5. A method according to claim 4, wherein the second code represents a concatenation of the first code and an additional code.

6. A method according to claim 5, wherein the additional code comprises a code operative to produce an increased signal to noise ratio sufficient to realize a predetermined coding gain from the first code.

7. A method according to claim 5, wherein the additional code comprises one of an orthogonal code and a quasi-orthogonal code.

8. A method according to claim 7, wherein the second code comprises one of a Walsh-Hadamard code and a Nordstrom-Robinson code.

9. A method according to claim 4:
   wherein said step of transmitting is preceded by the steps of:
      formatting the message into a Data Link Layer frame that conforms to a Data Link Layer protocol;
      encoding the first Data Link Layer frame according to one of the first code or the second code to generate an encoded message; and
      generating a radio communications signal from the encoded message.

10. A method according to claim 1, comprising the steps of:
   transmitting the message on the first communications channel using a first amount of spectral resource; and
   transmitting the message on the second communications channel using a second amount of spectral resource that is substantially the same as the first amount of spectral resource.

11. A method according to claim 1, comprising the steps of:
   transmitting the message on the first communications channel at a first transmission rate; and
   transmitting the message on the second communications channel at a second transmission rate that is substantially the same as the first transmission rate.

12. A method according to claim 1, comprising the steps of:
   transmitting over the first communications channel at a first power level; and transmitting over the second communications channel at a second power level that is substantially the same as the first power level.

13. A method according to claim 1, comprising the steps of:
transmitting the message on the first communications channel at a first power level and a first transmission rate; and
transmitting the message on the second channel using at a second power level substantially the same as the first power lever and at a second transmission rate substantially the same as the first transmission rate.

14. A method according to claim 1, wherein said step of transmitting comprises the step of transmitting the message on the second communications channel when communications on the first communications channel are degraded.

15. A method according to claim 1, wherein said step of transmitting comprises the step of concurrently transmitting the message on the first communications channel and the second communications channel.

16. A method according to claim 1:
wherein said step of transmitting comprises the step of transmitting from a base station; and
wherein said step of receiving comprises the step of receiving at a subscriber unit.

17. A method according to claim 1:
wherein said step of transmitting comprises the step of transmitting from a subscriber unit; and
wherein said step of receiving comprises the step of receiving at a base station.

18. A method according to claim 1, wherein the message comprises at least one of a control message, a short message, a voice message and a data message.

19. A wireless communications system, comprising:
means for transmitting a message on at least one of a first communications channel having a first redundancy level or a second communications channel having a second redundancy level greater than the first redundancy level;
means for receiving a radio communications signal on one of the first communications channel and the second communications channel; and
means for demodulating the received radio communications signal to recover the message using a first demodulation scheme if the radio communications signal is received on the first communications channel and using a second demodulation scheme if the radio communications signal is received on the second communications channel, wherein said means for demodulating comprises means for coherently demodulating the received radio communications signal if the radio communications signal is received over the first communications channel and means for non-coherently demodulating the received radio communications signal if the radio communications signal is received over the second communications channel.

20. A system according to claim 19, wherein said means for transmitting comprises:
means for transmitting on the first communications channel using a first modulation constellation; and
means for transmitting on the second communications channel using a second modulation constellation representing a subset of the first modulation constellation.

21. A system according to claim 20, wherein the second modulation constellation provides binary modulation.

22. A system according to claim 19, wherein said means for transmitting comprises means for transmitting a first radio communications signal representing the message encoded according to one of a first code that is operative to produce the first redundancy level or a second code that is operative to produce the second redundancy level.

23. A system according to claim 22, wherein the second code represents a concatenation of the first code and an additional code.

24. A system according to claim 23, wherein the additional code comprises a code operative to produce an increased signal to noise ratio sufficient to realize a predetermined coding gain from the first code.

25. A system according to claim 23, wherein the additional code comprises one of an orthogonal code and a quasi-orthogonal code.

26. A system according to claim 25, wherein the second code comprises one of a Walsh-Hadamard code and a Nordstrom-Robinson code.

27. A system according to claim 20, comprising:
means for formatting the message into a Data Link Layer frame that conforms to a Data Link Layer protocol;
means for encoding the first Data Link Layer frame according to one of the first code or the second code to generate an encoded message; and
means for generating a radio communications signal from the encoded message.

28. A system according to claim 19, wherein said means for transmitting comprises:
means for transmitting the message on the first communications channel using a first amount of spectral resource; and
means for transmitting the message on the second communications channel using a second amount of spectral resource that is substantially the same as the first amount of spectral resource.

29. A system according to claim 19, wherein said means for transmitting comprises:
means for transmitting the message on the first communications channel at a first transmission rate; and
means for transmitting the message on the second communications channel at a second transmission rate that is substantially the same as the first transmission rate.

30. A system according to claim 19, wherein said means for transmitting comprises:
means for transmitting over the first communications channel at a first power level; and
means for transmitting over the second communications channel at a second power level that is substantially the same as the first power level.

31. A system according to claim 19, wherein said means for transmitting comprises:
means for transmitting the message on the first communications channel at a first power level and a first transmission rate; and
means for transmitting the message on the second channel using at a second power level substantially the same as the first power lever and at a second transmission rate substantially the same as the first transmission rate.

32. A system according to claim 19, comprising means for transmitting the message over the second communications channel when communications over the first communications channel are degraded.

33. A system according to claim 19, wherein said means for transmitting comprises means for concurrently transmitting the message on the first communications channel and the second communications channel.

34. A system according to claim 19:
   wherein said means for transmitting are positioned at a base station; and
   wherein said means for receiving is positioned at a subscriber unit.

35. A system according to claim 19:
   wherein said means for transmitting are positioned at a subscriber unit; and
   wherein said means for receiving is positioned at a base station.

36. A system according to claim 19, wherein the message comprises at least one of a control message, a short message, a voice message and a data message.

37. In a wireless communications unit, an apparatus comprising:
   normal message transmitting means for transmitting a message on a first communications channel at a first redundancy level using a first modulation; and
   high-penetration message transmitting means for transmitting the message on a second communications channel at a second redundancy level greater than the first redundancy level using a second modulation that is different from the first modulation, wherein the first modulation comprises a modulation suitable for coherent demodulation and wherein the second modulation comprises a modulation suitable for non-coherent modulation.

38. An apparatus according to claim 37:
   wherein said normal message transmitting means comprises means for transmitting on the first communications channel using a first modulation constellation; and
   wherein said high-penetration message transmitting means comprises means for transmitting on the second communications channel using a second modulation constellation representing a subset of the first modulation constellation.

39. An apparatus according to claim 38, wherein the second modulation constellation provides binary modulation.

40. An apparatus according to claim 37:
   wherein said normal message transmitting means comprises means for transmitting a radio communications signal representing the message encoded according to a first code that is operative to produce the first redundancy level; and
   wherein said high-penetration message transmitting means comprises means for transmitting a radio communications signal representing the message encoded according to a second code that is operative to produce the second redundancy level.

41. An apparatus according to claim 40, wherein the second code represents a concatenation of the first code and an additional code.

42. An apparatus according to claim 41, wherein the additional code comprises a code operative to produce an increased signal to noise ratio sufficient to realize a predetermined coding gain from the first code.

43. An apparatus according to claim 42, wherein the additional code comprises one of an orthogonal code and a quasi-orthogonal code.

44. An apparatus according to claim 43, wherein the additional code comprises one of a Walsh-Hadamard code and a Nordstrom-Robinson code.

45. An apparatus according to claim 40, comprising:
   means for formatting the message into a Data Link Layer frame that conforms to a Data Link Layer protocol;
   means for encoding the first Data Link Layer frame according to one of the first code or the second code to generate an encoded message; and
   means for generating a radio communications signal from the encoded message.

46. An apparatus according to claim 37, comprising means for concurrently transmitting the message on the first communications channel and the second communications channel.

47. An apparatus according to claim 37, wherein the wireless communications unit comprises one of a base station or a subscriber unit.

48. An apparatus according to claim 37, wherein the message comprises at least one of a control message, a short message, an acknowledgement message, a voice message and a data message.

49. In a wireless communications unit, an apparatus comprising:
   radio communications signal receiving means for receiving a radio communications signal on one of a first communications channel and a second communications channel; and
   means, responsive to said radio communications signal receiving means, for demodulating the received radio communications signal to recover a message, wherein the demodulation occurs according to one of a first demodulation scheme or a second demodulation scheme that is selected based on whether the radio communications signal is received on the first communications channel or the second communications channel, wherein said means for demodulating comprises means for coherently demodulating the received radio communications signal if the radio communications signal is received over the first communications channel and for non-coherently demodulating the received radio communications signal if the radio communications signal is received over the second communications channel.

50. An apparatus according to claim 49:
   wherein said means for coherently demodulating comprises means for demodulating a received radio communications signal that is encoded according to first code that is operative to produce a first redundancy level; and
   wherein said means for non-coherently demodulating comprises means for demodulating a received radio communications signal that is encoded according to a second code that is operative to produce a second redundancy level greater than the first redundancy level.

51. An apparatus according to claim 50, wherein the second code represents a concatenation of the first code and additional code.

52. An apparatus according to claim 51, wherein the additional code comprises one of an orthogonal code and a quasi-orthogonal code.

53. An apparatus according to claim 52, wherein the additional code comprises one of a Walsh-Hadamard code and a Nordstrom-Robinson code.

54. A method of communicating in a wireless communication system, the method comprising:
   transmitting respective messages on first and second communications channels at respective different first and second redundancy levels using a common modulator, wherein the common modulator modulates the message transmitted on the first communications channel according to a first modulation constellation, and wherein the message transmitted on the second communications channel is encoded such that the common modulator is constrained to modulate the message transmitted on the second communications channel according to a second modulation constellation that is a subset of the first modulation constellation.

55. A method according to claim 54, wherein the first and second communications channels comprise respective first and second control channels.

56. A method according to claim 54, wherein the first modulation constellation is operative to produce a signal that is amenable to coherent demodulation to recover the message transmitted on the first communications channel and wherein the second modulation constellation produces a signal that is amenable to noncoherent demodulation to recover the message transmitted on the second communications channel.

57. A method according to claim 54, wherein the first communications channel employs a first code that is operative to produce the first redundancy level and wherein the second communications channel employs a second code that is operative to produce the second redundancy level, and wherein the second code represents a concatenation of the first code and an additional code.

58. A method according to claim 57, wherein the additional code comprises one of an orthogonal code and a quasi-orthogonal code.

59. A method according to claim 58, wherein the second code comprises one of a Walsh-Hadamard code and a Nordstrom-Robinson code.

60. A method according to claim 54, further comprising formatting messages to be transmitted on the first and second communications channels according to a common Data Link Layer frame format.

61. A method according to claim 54, further comprising:
receiving a radio communications signal representing one of the transmitted messages on one of the first communications channel and the second communications channel;
selecting one of a first demodulation scheme or a second demodulation scheme based on whether the radio communications signal is received on the first communications channel or the second communications channel; and
demodulating the received radio communications signal according to the selected demodulation scheme to recover the one message.

62. A method according to claim 61, wherein the first demodulation scheme comprises a coherent demodulation scheme and wherein the second demodulation scheme comprises a noncoherent demodulation scheme.

63. A wireless communications apparatus, comprising:
normal message transmitting means for transmitting messages on a first communications channel at a first redundancy level, the normal message transmitting means comprising a modulating means for modulating messages to be transmitted on the first communications channel according to a first modulation constellation; and
high-penetration message transmitting means for transmitting a message on a second communications channel at a second redundancy level, the high-penetration message transmitting means including the modulating means and means for encoding the message transmitted on the second communications channel such that the modulating means is constrained to modulate the message transmitted on the second communications channel according to a second modulation constellation that is a subset of the first modulation constellation.

64. An apparatus according to claim 63, wherein the first and second communications channels comprise respective first and second control channels.

65. An apparatus according to claim 63, wherein the first modulation constellation is operative to produce a signal that is amenable to coherent demodulation to recover the message transmitted on the first communications channel and wherein the second modulation constellation produces a signal that is amenable to noncoherent demodulation to recover the message transmitted on the second communications channel.

66. An apparatus according to claim 63:
wherein said normal message transmitting means comprises means for transmitting messages encoded according to a first code that is operative to produce the first redundancy level; and
wherein said high-penetration message transmitting means comprises means for transmitting messages encoded according to a second code that is operative to produce the second redundancy level, wherein the second code represents a concatenation of the first code and an additional code.

67. An apparatus according to claim 66, wherein the additional code comprises one of an orthogonal code and a quasi-orthogonal code.

68. An apparatus according to claim 67, wherein the additional code comprises one of a Walsh-Hadamard code and a Nordstrom-Robinson code.

69. An apparatus according to claim 63, comprising means for formatting messages to be transmitted on the first and second communications channels according to a common Data Link Layer format.

* * * * *